United States Patent
Czarnocha et al.

(10) Patent No.: US 6,504,630 B1
(45) Date of Patent: Jan. 7, 2003

(54) AUTOMATIC POWER SHUT-DOWN ARRANGEMENT FOR OPTICAL LINE SYSTEMS

(75) Inventors: William Czarnocha, Holmdel, NJ (US); John G. Israel, Monmouth County, NJ (US); Bradley A. McKay, Fair Haven, NJ (US); Chu Ng, Woodbridge, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/205,512

(22) Filed: Dec. 4, 1998

(51) Int. Cl.[7] .............................................. H04B 10/02
(52) U.S. Cl. ..................... 359/110; 359/174; 359/177
(58) Field of Search ................................ 359/110, 174, 359/177, 161; 250/551

(56) References Cited

U.S. PATENT DOCUMENTS

| | | | | |
|---|---|---|---|---|
| 4,994,675 A | * | 2/1991 | Levin et al. ................. | 250/551 |
| 5,099,349 A | * | 3/1992 | Yoshida et al. ............. | 359/161 |
| 5,136,410 A | * | 8/1992 | Heiling et al. .............. | 359/110 |
| 5,428,471 A | | 6/1995 | McDermott .................. | 359/177 |
| 5,500,756 A | * | 3/1996 | Tsushima et al. ........... | 359/174 |
| 5,923,453 A | * | 7/1999 | Yoneyama ................... | 359/177 |
| 6,359,708 B1 | * | 3/2002 | Goel et al. .................. | 359/110 |

FOREIGN PATENT DOCUMENTS

| | | | | |
|---|---|---|---|---|
| EP | 0 382 243 A | 8/1990 | ........... | H04B/10/08 |
| EP | 0 437 162 A | 7/1991 | ........... | H04B/10/08 |
| EP | 0 853 394 A | 7/1998 | ........... | H04B/10/08 |
| EP | 0 903 875 A | 3/1999 | ......... | H04B/10/152 |
| WO | WO 98 54862 A | 12/1998 | ........... | H04J/14/02 |

OTHER PUBLICATIONS

U.S. patent application Ser. No. 08/932,679, filed Sep. 18, 1997, entitled "Optical Transmission Line Automatic Power Shut–Down System".

* cited by examiner

*Primary Examiner*—Jason Chan
*Assistant Examiner*—David C. Payne
(74) *Attorney, Agent, or Firm*—Gregory J. Murgia (57) ABSTRACT

An arrangement is provided which detects the loss of a high power signal in an optical transmission path and the loss of supervisory signal power and, in response thereto, automatically invokes a procedure which causes an optical signal source connected to the fiber to reduce the power level at which it is transmitting optical signals over the fiber to a safe level. More specifically, reduction of optical signal power supplied by an upstream network element by a prescribed amount is achieved by automatically controlling the output power level of the upstream network element in response to the detection of both loss of signal power and loss of supervisory signal power at a downstream network element as a result of a fiber cut, open connector, or other potentially hazardous discontinuity.

8 Claims, 4 Drawing Sheets

AUTOMATIC POWER SHUT-DOWN ARRANGEMENT FOR OPTICAL LINE SYSTEMS

FIELD OF THE INVENTION

The invention relates generally to lightwave communication systems and, more particularly, to techniques for controlling the power level of optical signals transmitted in optical line transmission systems.

BACKGROUND OF THE INVENTION

Retinal and other types of eye injury can occur from inadvertent direct exposure to the optical signals used in present communication systems. Danger is presented by the power and the wavelength of such signals. Generally, these systems operate with signals having relatively high power concentrated in a tiny beam located outside the visible region.

Recent developments in optical networking have only heightened existing safety concerns. For example, optical amplifiers and other optical components are now being developed to drive optical signals to even higher output power levels. Multi-wavelength systems are also a concern because the total optical power in the optical fiber is the sum of the powers of the individual wavelength components. Consequently, optical systems having total output power of 17 dBm or more (e.g., class 3B power levels) are now being realized as a result of advances in optical amplifier and multi-wavelength optical networking technologies.

Because the extent of injury is most likely proportional to the total output power and the time of exposure, it is necessary to quickly shut off or reduce the output power of a network element in the event of a fiber cut, removed connector, or any other discontinuity in the optical path. In fact, this requirement is mandated by the well-known international standard IEC 60825 for optical transmission systems as set forth by International Electro-technical Commission (IEC), see, for example, the IEC publication International Standard IEC 60825, Safety of Laser Products part 1: Equipment Classification, Requirements and User's Guide, 1997, which is hereby incorporated by reference.

In some prior arrangements, optical power is controlled as a function of the detection of loss of signal (LOS) in the optical traffic channels. For example, upon detection of loss of signal, a controller is used to send messages to an upstream controller which, in turn, causes the upstream optical source to reduce its power level. One of several disadvantages in these types of arrangements is the delay in effecting control as a result of the messaging that must take place, which is typically software-based messaging. Another disadvantage in these prior arrangements is the amount of bandwidth that is used to support the messaging over the supervisory channels. Furthermore, prior control arrangements that are triggered only by the detection of loss of signal in the traffic channels are known to cause unnecessary power shutdowns, which disrupt service and are undesirable to service providers and customers alike.

SUMMARY OF THE INVENTION

Reduction of optical signal power supplied by an upstream network element by a prescribed amount is achieved by automatically controlling the output power level of the upstream network element in response to the detection of both loss of signal power and loss of supervisory signal power at a downstream network element as a result of a fiber cut, open connector, or other potentially hazardous discontinuity. More specifically, by separately controlling the supervisory signal and traffic signals being transmitted from the downstream network element to the upstream network element, control of the upstream network element can be effected without the software-based supervisory messaging which is used in prior arrangements. Moreover, triggering control as a function of the detection of loss of signal in both the traffic and the supervisory channels according to the principles of the invention prevents unnecessary power shutdowns, thus providing a more reliable and robust control scheme as compared with prior arrangements.

In one illustrative embodiment, an optical line system includes two or more network elements, each including optical amplifiers and associated supervisory and control units. In a typical configuration, the network elements are connected so that an optical amplifier in each network element supports transmission of optical signals in one direction along a first optical fiber and another optical amplifier in each network element supports transmission of optical signals in the opposite direction along a second optical fiber. As a result of a cut in the first optical fiber, a loss of signal in the traffic channels and a loss of supervisory signal is detected at the input of the downstream or receiving optical amplifier in the first optical fiber. In response thereto, the optical amplifier transmitting toward the upstream network element via the second optical fiber is shut down. Because the second optical fiber path is not actually cut, the supervisory signal is still being supplied along the second optical fiber path even in the absence of the traffic channels. However, the supervisory signal being transmitted to the upstream network element is then shut down for a predetermined period of time. By shutting off the supervisory signal in the second optical fiber path for a predetermined period of time, a fiber cut is effectively emulated within the second optical fiber path, i.e., loss of signal power (by shutting off the optical amplifier) and loss of supervisory signal (by appropriately controlling the supervisory unit). In response to the detection of loss of signal power and loss of supervisory signal power at the input of the upstream optical amplifier, the upstream optical amplifier is then shut-down and the hazardous condition on the first optical fiber is removed.

BRIEF DESCRIPTION OF THE DRAWING

A more complete understanding of the present invention may be obtained from consideration of the following detailed description of the invention in conjunction with the drawing, with like elements referenced with like references, in which.

DETAILED DESCRIPTION OF THE INVENTION

Although the illustrative embodiments described herein are particularly well suited for controlling the output power levels of optical signals generated by optical amplifiers in an optical line transmission system, and shall be described in this exemplary context, those skilled in the art will understand from the teachings herein that the principles of the invention may also be employed in conjunction with other network elements used in an optical transmission system, such as, optical multiplexer/demultiplexer units, wavelength add/drop elements, and the like. Accordingly, the embodiments shown and described herein are only meant to be illustrative and not limiting.

In a typical optical line system, an automatic power shutdown arrangement may be desirable at various locations within the system at which there is a risk of exposure to unsafe levels of optical power in the event of a fiber cut or other optical discontinuity. For example, possible output power levels could be unsafe in the following locations within an optical line system: between optical amplifiers; between an optical amplifier and an optical demultiplexer unit; between an optical amplifier and wavelength add/drop equipment; and between wavelength add/drop equipments, to name a few.

When automatic power shut-down is desired between optical amplifiers or between an optical amplifier and an optical demultiplexer unit, the detection of loss of signal occurs at the input side of the downstream or receiving optical amplifier or optical demultiplexer unit, respectively. When automatic power shut-down is desired between an optical amplifier and a wavelength add/drop element or between wavelength add/drop elements, the detection of loss of signal could occur at the downstream wavelength add/drop element.

According to the principles of the invention, automatic power shut-down is carried out to control the output power levels of the optical sources, e.g., optical amplifiers, in the presence of a broken jumper or fiber cut. In general, driving pumps associated with the respective optical amplifiers are turned down to equal to or less than an acceptable minimum power level, e.g., a hazard level 1 or 10 dBm, within a specified time period from when the exposure begins. Importantly, the automatic power shut-down procedure according to the principles of the invention is triggered by the detection of both the loss of signal power in the traffic channels (i.e., information-bearing optical signals) and the loss of supervisory signal power.

According to another aspect of the invention, power levels are re-established by automatically restarting the pump power to the respective optical amplifiers once the fiber cut, broken jumper, or the like has been restored. Importantly, the automatic power restart procedure is a self-restoring function activated by the supervisory signal. To avoid optical surges when restarting the pump power of an optical amplifier, the pumps are turned up incrementally while received optical signal power is closely monitored at remote network elements.

Figure 1:
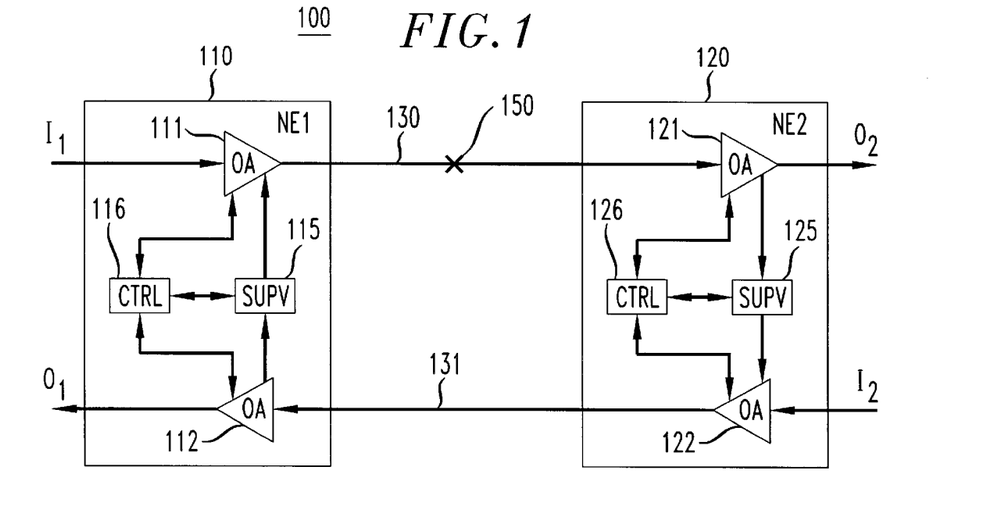
FIG. 1 is a simplified block diagram showing an optical transmission system in which the principles of the invention may be practiced.

More specifically, FIG. 1 shows an illustrative optical transmission system 100 in which the automatic power shut-down feature can be implemented according to the principles of the invention. For purposes of this description, it is assumed that system 100 transmits optical signals at a power level of, for example, +22.5 dBm. However, it should be noted that the principles of the invention can be used in any system in which it is desirable to maintain power levels at or below hazardous levels. As such, the power level assumed for system 100 is only meant to be illustrative and not limiting in any way. As shown, optical transmission system 100 includes network element 110 and network element 120 coupled by transmission facilities, such as optical fiber paths 130 and 131. As shown, optical transmission system 100 is configured in this illustrative embodiment to provide west to east communications via optical fiber path 130 and east to west communications via optical fiber path 131.

More specifically, network element 110 includes optical amplifier 111 for receiving information-bearing optical signals $I_1$ (i.e., traffic signals), amplifying the traffic signals, and supplying these amplified signals along optical fiber path 130 in the west to east direction to network element 120. Network element 110 further includes optical amplifier 112 for receiving and amplifying optical signals supplied from network element 120 in an east to west direction along optical fiber path 131 and supplying these amplified signals as output signals $O_1$. Network element 110 also includes a supervisory unit 115 for providing the necessary supervisory and telemetry functions associated with optical amplifiers. The operation of supervisory and telemetry packs is well-known to those skilled in the art. In general, a supervisory pack is used to facilitate messaging across a supervisory data link established between optical components such as optical amplifiers and the like. The supervisory data link, supervisory signal, or supervisory channel, which are referred interchangeably herein, is a separate channel from the information-bearing optical signals, i.e., traffic channels. It should be noted that the signal power of the supervisory signal is typically well below defined danger thresholds, such as those set forth in the aforementioned IEC standard.

Network element 110 further includes a controller 116 for controlling the operation of the various components within network element 110. As is well known, optical transmission systems typically include a hierarchical control architecture. For example, each circuit pack in a network element may include a separate controller to control the functions within the circuit pack. Additional controllers above the circuit pack level may also be used in the control hierarchy to communicate with the various circuit pack controllers and to carry out different control functions. Controller 116 for network element 110 is one such example. The basic operation of controllers, such as controller 116, is well known to those skilled in the art.

Similarly, network element 120 includes optical amplifiers 121 and 122 for receiving, amplifying, and supplying optical signals in the respective directions along optical fiber paths 130 and 131, respectively. More specifically, optical amplifier 122 receives information bearing optical signals $I_2$ (i.e., traffic signals), amplifies these traffic signals, and supplies the amplified signals along optical fiber path 131 in the east to west direction to network element 110. Optical amplifier 121 receives and amplifies optical signals supplied from network element 110 in a west to east direction along optical fiber path 130 and supplies the amplified signals as output signals $O_2$. Network element 120 also includes supervisory unit 125 and controller 126 for carrying out similar functions as those described for the corresponding elements in network element 110.

In normal operation, optical amplifier 111 in network element 110 amplifies information-bearing optical signals (i.e., traffic channels) and transmits these optical signals along with a supervisory signal supplied by supervisory unit 115 along optical fiber path 130. By way of example only, a supervisory signal may comprise maintenance information, messages, and the like. Optical amplifier 121 in network element 120 receives the signals for further processing. For example, the supervisory signal may be separated from the information-bearing optical signals and provided to supervisory unit 125 to facilitate control of network element 120 in conjunction with controller 126. The same principles of operation apply for communication in the opposite direction along optical fiber path 131 involving the respective components of network elements 110 and 120.

Figure 2:
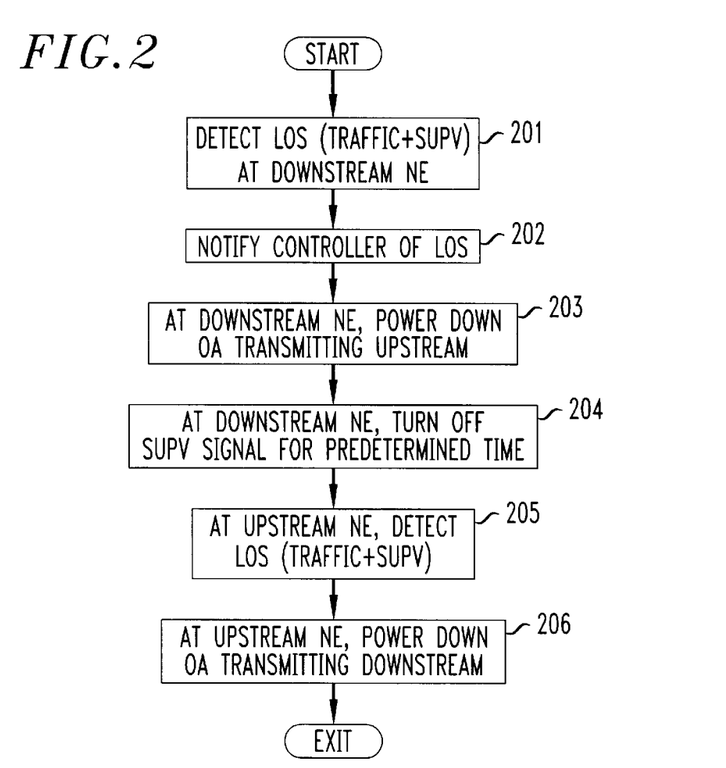
FIG. 2 is a simplified flow chart illustrative of the automatic power shut-down procedures according to the principles of the invention.

As described, the amplified optical signals in optical fiber path 130 are assumed to have a power level of approximately +22.5 dBm in one illustrative configuration. As such, a cut in optical fiber path 130, indicated as fiber cut 150, may create an unsafe condition in that a technician may be exposed to high power optical signals transmitted at the location of fiber cut 150. As such, an automatic power shut-down arrangement is needed to eliminate the hazardous condition. FIG. 2 shows one illustrative embodiment of a method according to the principles of the invention. For ease of understanding, the automatic power shut-down procedures shown in FIG. 2 are described in the context of eliminating the hazard created by fiber cut 150 in the system shown in FIG. 1.

Fiber cut 150 (FIG. 1) would prevent the transmission of optical signals, both information-bearing signals (i.e., traffic channels) and the supervisory signal, from optical amplifier 111 in network element 110 in the downstream direction, for example, to optical amplifier 121 in network element 120. According to the principles of the invention, a loss of signal in the information-bearing optical signals (referred hereinafter as "traffic signals") and loss of supervisory signal is detected (step 201 in FIG. 2), in a conventional manner, at the input of downstream optical amplifier 121 as a result of fiber cut 150 in optical fiber path 130. In response to the detection of a loss of signal (traffic and supervisory), optical amplifier 122 is shut down so that the traffic signals are not transmitted from optical amplifier 122 in network element 120 in the upstream direction to optical amplifier 112 in network element 110 via optical fiber path 131 (step 203 in FIG. 2). By way of example, the loss of signal detected at the input of optical amplifier 121 may be communicated to controller 126 (step 202 in FIG. 2) which, in turn, may effect the shut-down of optical amplifier 122 by turning off the pump power supplied to optical amplifier 122. Other well-known techniques may also be used for shutting down optical amplifier 122. Because optical fiber path 131 is not actually cut, the supervisory signal supplied from supervisory unit 125 to optical amplifier 122 is still being supplied along optical fiber path 131 even in the absence of the information-bearing optical signals. As such, controller 126 is also used to shut off the supervisory signal supplied from supervisory unit 125 to optical amplifier 122 for a predetermined period of time (step 204 in FIG. 2). In the illustrative embodiments shown and described herein, the predetermined time is one (1) second, although this example is only meant to be illustrative and not limiting. For reasons that will be described below in more detail, supervisory unit 125 is directed to again supply the supervisory signal after the predetermined period of time has expired.

By shutting off the supervisory signal in optical fiber path 131 for a predetermined period of time in the direction from downstream network element 120 to upstream network element 110, a fiber cut is effectively emulated within optical fiber path 131, i.e., loss of signal power (by shutting off optical amplifier 122) and loss of supervisory signal (by appropriately controlling supervisory unit 125). Shutting down the output power level of optical amplifier 122 also provides protection in the case where an entire cable carrying both optical fiber path 131 and optical fiber path 130 is cut.

Because optical amplifier 111 continues to transmit its optical signals at a high level of power, e.g., a class 3B level, these signals may be concentrated at the transmission end of fiber 150, which could harm a craftsperson who accidentally looks at the signal directly without proper eye protection. Accordingly, in response to the detection of loss of signal power and loss of supervisory signal power at the input of optical amplifier 112 in upstream network element 110 (step 205 in FIG. 2), controller 116 directs optical amplifier 111 to shut-down (step 206 in FIG. 2). As previously described, optical amplifier 111 may be shut down using conventional methods employed in network elements, e.g., using controller 116 to send a message to a controller in the optical amplifier circuit pack which in turn effects control over the supply of pump power to optical amplifier 111.

As described, the receipt of a loss of signal indication at optical amplifier 121 at a point downstream from fiber cut 150, in effect, causes the shut-down of output power of upstream optical amplifier 111 using the control and supervisory functions within network elements 110 and 120.

It should be noted that other modifications will be apparent to those skilled in the art and are contemplated by the teachings herein. For example, the output power level of the optical amplifiers may be reduced to a safe level, e.g., a class 1 level, instead of being shut down completely. Consequently, any reference herein to a complete shut-down of output power is meant to be illustrative and not limiting. It should also be noted that appropriate messaging can be implemented to inform the user that the automatic power reduction or shut-down feature has been invoked. For example, a message indicative of the detection of loss of signal power and supervisory signal power at optical amplifier 121 can be communicated to controller 126, which in turn can generate the appropriate messaging through the system for the user.

The predetermined time period for temporarily shutting off the supervisory signal supplied by supervisory unit 125 is a matter of design choice and is typically driven by applicable standards or requirements. For example, the aforementioned IEC 60825 standard recommends one second for applications involving a 1550 nm laser and single mode fiber with an 8.8 $\mu$m core diameter. In one exemplary embodiment, the time measured from detecting loss of signal at optical amplifier 121 to shutting off or reducing the output power in optical amplifier 122 can be less than approximately 0.5 seconds. Similarly, the time measured from detecting loss of signal at optical amplifier 112 to shutting off or reducing the output power in optical amplifier 111 can be less than approximately 0.5 seconds. Consequently, for this embodiment, shutting off the supervisory signal supplied by supervisory unit 125 for one second is adequate for invoking the automatic power shut-down of optical amplifier 111 to eliminate the hazardous condition.

Figure 3:
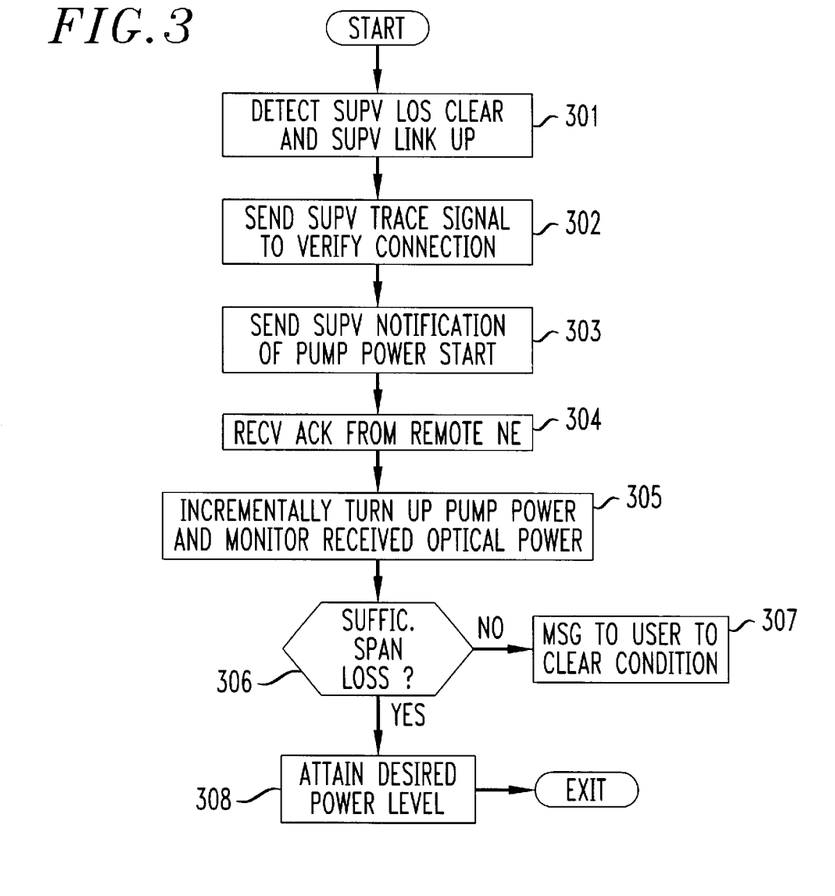
FIG. 3 is a simplified flow chart illustrative of the automatic power restart procedures according to the principles of the invention.

According to another aspect of the invention shown in FIG. 3, operating power levels can be restored automatically after the optical fiber path is restored. Importantly, the automatic power restart procedure according to the principles of the invention is a function of the supervisory signal. For a more complete understanding of the invention, the restart procedures set forth in the flowchart of FIG. 3 will be described in the context of the optical line system previously shown and described in FIG. 1. More specifically, once fiber cut 150 (FIG. 1) has been repaired in optical fiber path 130, optical amplifier 121 will begin receiving normal messaging via the supervisory signal channel generated by supervisory unit 115 from network element 110. In particular, once fiber cut 150 is repaired, the loss of supervisory signal condition is cleared and, at some subsequent point, the system detects that the supervisory data link is restored and operational as shown by step 301 in FIG. 3. As is well-known, messaging that occurs in the supervisory channel relating to the verification of continuity in the transmission path between network elements is sometimes referred to as "are you alive" type queries and responses. Prior to fiber cut 150 being restored, optical amplifier 121 was not receiving the messages because the supervisory signal channel was also disrupted. After restoration of optical fiber path 130 (FIG. 1), optical amplifier 121 and supervisory unit 125 will receive the "are you alive" queries from network element 110 via optical fiber path 130. In order for network element 120 to respond to the "are you alive" queries, optical amplifier 122 must be able to communicate via the supervisory data link. Because the supervisory signal generated by supervisory unit 125 is only temporarily turned off but a then back on during the automatic power shut-down sequence, optical amplifier 122 can communicate via the supervisory data link once the signal is turned back on. In particular, upon receiving the "are you alive" message, supervisory unit 125 in network element 120 responds with an "I am alive" type response via the supervisory signal transmitted from optical amplifier 122 to optical amplifier 112 via optical fiber path 131. Once the supervisory units 115 and 125 in network elements 110 and 120, respectively, establish the appropriate handshaking via the supervisory signal channel, controller 126 in network element 120 directs optical amplifier 122 to begin a power up sequence.

In one embodiment, prior to supplying pump power, a supervisory trace signal is also sent to establish that no misconnection of fiber exists between network elements 110 and 120 (step 302 in FIG. 3). As indicated by step 303, remote network element 110 is notified via the supervisory data link that network element 120 is preparing to increase pump power for optical amplifier 122. After acknowledgement is received from network element 110 (step 304), pump power is incrementally increased (step 305) and the received optical power at network element 110 is monitored accordingly. Importantly, the pump power is incrementally increased so as to avoid power surges which can otherwise damage equipment in the network elements.

According to a particularly important aspect of the automatic power restart procedure, the pump power is incrementally increased and the received optical power is monitored to ensure that the output power levels in the transmission line are below hazardous levels during the restart procedure. One method for achieving this result is to check for sufficient span loss between the network elements (step 306) to ensure that hazardous power levels cannot be exceeded. For example, when optical amplifier 122 reaches its operating power or another predetermined threshold, e.g., 12 dBm, whichever comes first, network element 120 can send a message informing network element 110 of the output power level of optical amplifier 122. Network element 120 would then wait for a response from network element 110 before increasing the output power level of optical amplifier 122. If the loss between optical amplifier 122 and optical amplifier 112 is greater than or equal to a predetermined level, e.g., 10 dB, then network element 110 sends a message to inform network element 120 that there is sufficient span loss. The pump power supplied to optical amplifier 122 can then be incrementally increased until the desired operating power level is achieved (step 308). If there is insufficient span loss, e.g., less than the predetermined level (e.g., 10 dB), a message to this effect can then be sent to the user (step 307). This alarm condition would prompt the user to take further remedial action to clear the condition before pump power to optical amplifier 122 is increased. As stated, the purpose of checking for sufficient span loss between the network elements during installation is to ensure that the links between the various circuit packs in a receiving network element are less than the prescribed hazard power level thresholds, e.g., 17 dBm hazard power level. It should be noted that optical amplifier 111 in network element 110 can be restored in the same manner as that previously described for optical amplifier 122.

Although 10 dB span loss was described in the preceding embodiment as "sufficient span loss", it should be noted that this example is meant to be illustrative only and not limiting in any way. In practice, the predetermined level (or threshold) that constitutes sufficient span loss will depend on several factors including, for example, the output power level of the optical amplifiers. For the illustrative embodiments shown and described herein, an exemplary output power level of +22.5 dBm was assumed for the optical amplifiers. In such a system, 10 dB span loss would ensure no more than 12.5 dBm (i.e., 22.5 dBm less the 10 dB span loss) at the input of a receiving network element, which is well below the established hazard level of 17 dBm. Consequently, for other systems operating at different output power levels, the predetermined level or threshold of span loss can be selected accordingly.

Figure 4:
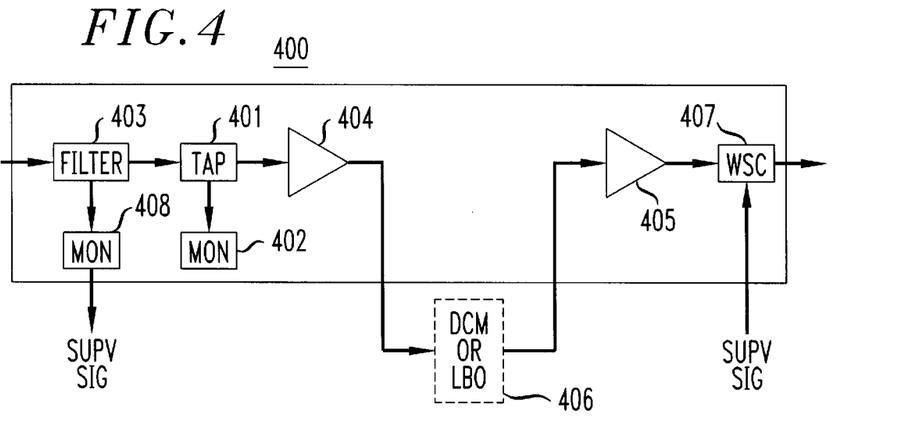
FIG. 4 is a simplified block diagram of one exemplary embodiment of an optical amplifier in which the principles of the invention can be used.

FIG. 4 shows a simplified block diagram of one exemplary embodiment of an optical amplifier 400 which can be used in conjunction with the principles of the invention. For example optical amplifier 400 may be suitable for any of optical amplifiers 111, 112, 121, or 122 in system 100 of FIG. 1. Referring again to FIG. 4, optical amplifier 400 may include two or more amplifier stages 404 and 405. In practice, a dispersion compensation module or a line build out module 406 may be coupled between the amplifier stages 404 and 405 to provide the desired dispersion compensation or attenuation using techniques well-known to those skilled in the art. In one illustrative embodiment, optical amplifier 400 may include a tap 401 and monitoring element 402 for tapping and monitoring, in a conventional manner, a portion of the input signal prior to the first amplifier stage 404. As is well-known, the tapped signal may be used for control or other performance monitoring of the amplifier performance.

Optical amplifier 400 is also shown to include a filter 403 and monitoring element 408 prior to the input of first amplifier stage 404 for dropping the supervisory signal in a conventional manner as previously described. By dropping the supervisory signal prior to amplifier stages 404 and 405, only the information-bearing optical signals, i.e., traffic channels, are amplified in optical amplifier 400. At the output of amplifier stage 405, the supervisory signal is added using a conventional wavelength selective coupler, e.g., a wavelength division multiplexing (WDM) coupler. Importantly, by adding the supervisory signal after the amplifier stages 404 and 405, the supervisory signal can be turned on and off independent of the amplifier stages as required by the principles of the invention. For example, as previously described, optical amplifier 122 (FIG. 1) is shut down, but the supervisory signal generated by supervisory unit 125 is separately shut off for a predetermined period of time and then turned back on even while optical amplifier 122 is still powered down, i.e., while pump power is not supplied to the amplifier. If the supervisory signal was added prior to the amplification stages 404 or 405, then the supervisory signal would be shut down every time the amplifier stages were powered down. Optical amplifier 400 is only meant to be illustrative and other modifications apparent to those skilled in the art can be used to practice the principles of the invention and are contemplated by the teachings herein.

Referring again to FIG. 1, the principles of the invention can also be advantageously employed when both optical fiber paths 130 and 131 are cut. For example, if optical fiber path 131 is cut (not shown), then the same procedures previously described can also be implemented except that the downstream elements (relative to the location of the fiber cut and direction of transmission) are now in network element 110 while the upstream elements are in network element 120. The applicable procedures set forth in FIGS. 2 and 3 will not be repeated here for reasons of brevity.

Figure 5:
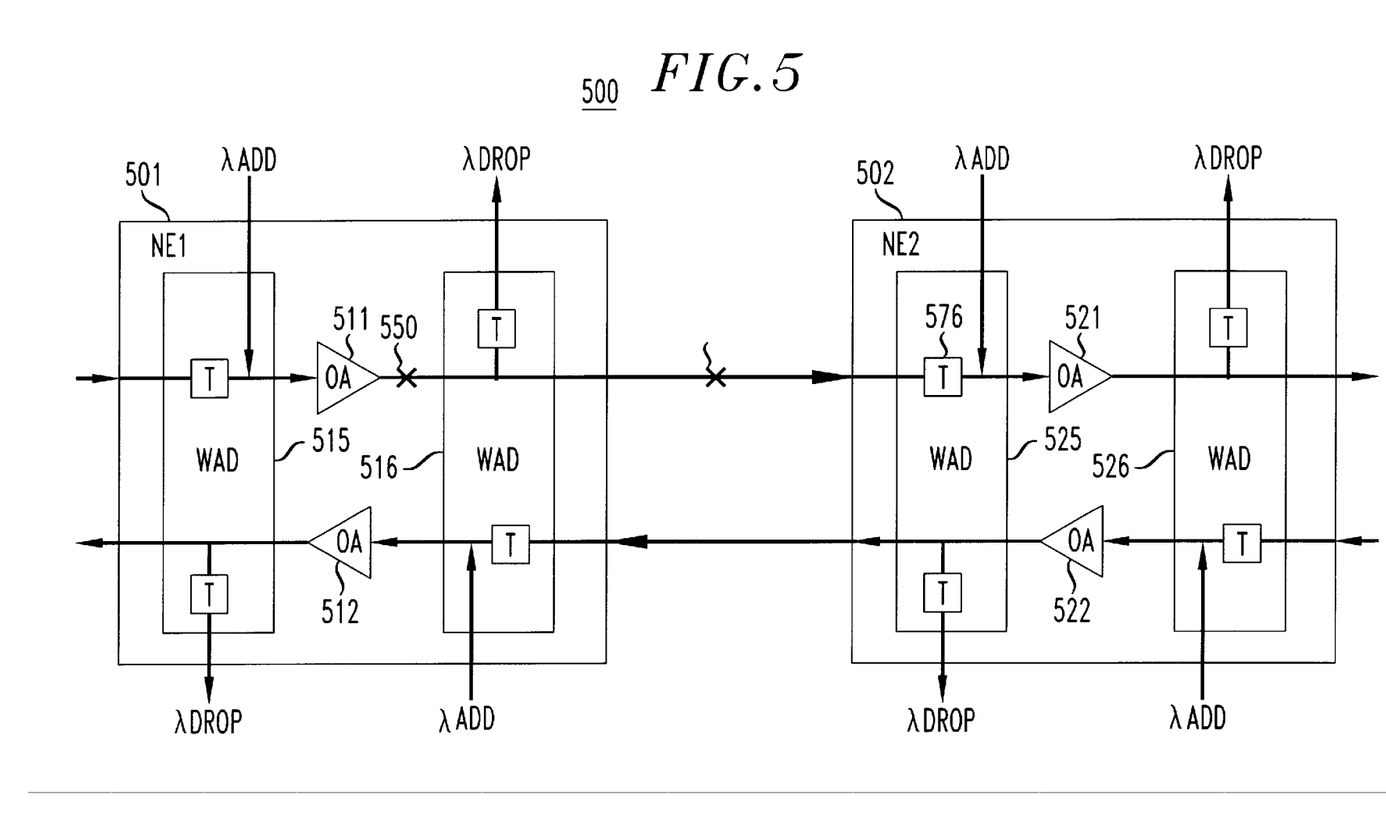
FIGS. 5–7 are simplified block diagrams other exemplary embodiments of optical transmission system configurations in which the principles of the invention may be practiced.

FIG. 5 shows another illustrative embodiment of a system in which the principles of the invention may be employed. More specifically, system 500 includes wavelength add/drop (WAD) units and optical amplifiers within network elements 501 and 502. More specifically, network element 501 includes WAD units 515 and 516 with optical amplifiers 511 and 512 coupled therebetween. Similarly, network element 502 includes WAD units 525 and 526 with optical amplifiers 521 and 522 coupled therebetween. Each of the WAD units includes one or more taps and associated monitors used for monitoring the power levels of signals in the add, drop, and through paths of the WAD units.

The principles of operation of the automatic power shut-down procedure is similar to that previously described for the optical amplifier-based system 100 in FIGS. 1–3. Accordingly, only the major differences will be explained here for sake of brevity. Illustratively, the automatic power shut-down procedure can be used to eliminate the hazard from fiber cut 550 or fiber cut 551, for example. In either case, the trigger criteria for the automatic power shut-down is both the detection of loss of signal in the "through" wavelengths as measured in tap/monitor 576 and the detection of loss of supervisory signal as determined by downstream optical amplifier 521. The remaining procedures shown and described in FIGS. 1–3 apply equally here. It should also be noted that certain locations in WAD configurations may not require an automatic power shut-down procedure, but instead may be protected by virtue of the automatic restart procedures previously described, e.g., incremental power increase in conjunction with maintaining sufficient span loss within particular segments. For example, using 22.5 dBm as the exemplary output power level of the system and 10 dB as the predetermined level for sufficient span loss, the link between WAD unit 525 and optical amplifier 521 would not require automatic power shut-down because the power level at the input of WAD unit 525 or at optical amplifier 521 would not exceed the 17 dBm hazard level threshold.

Figures 6, 7:
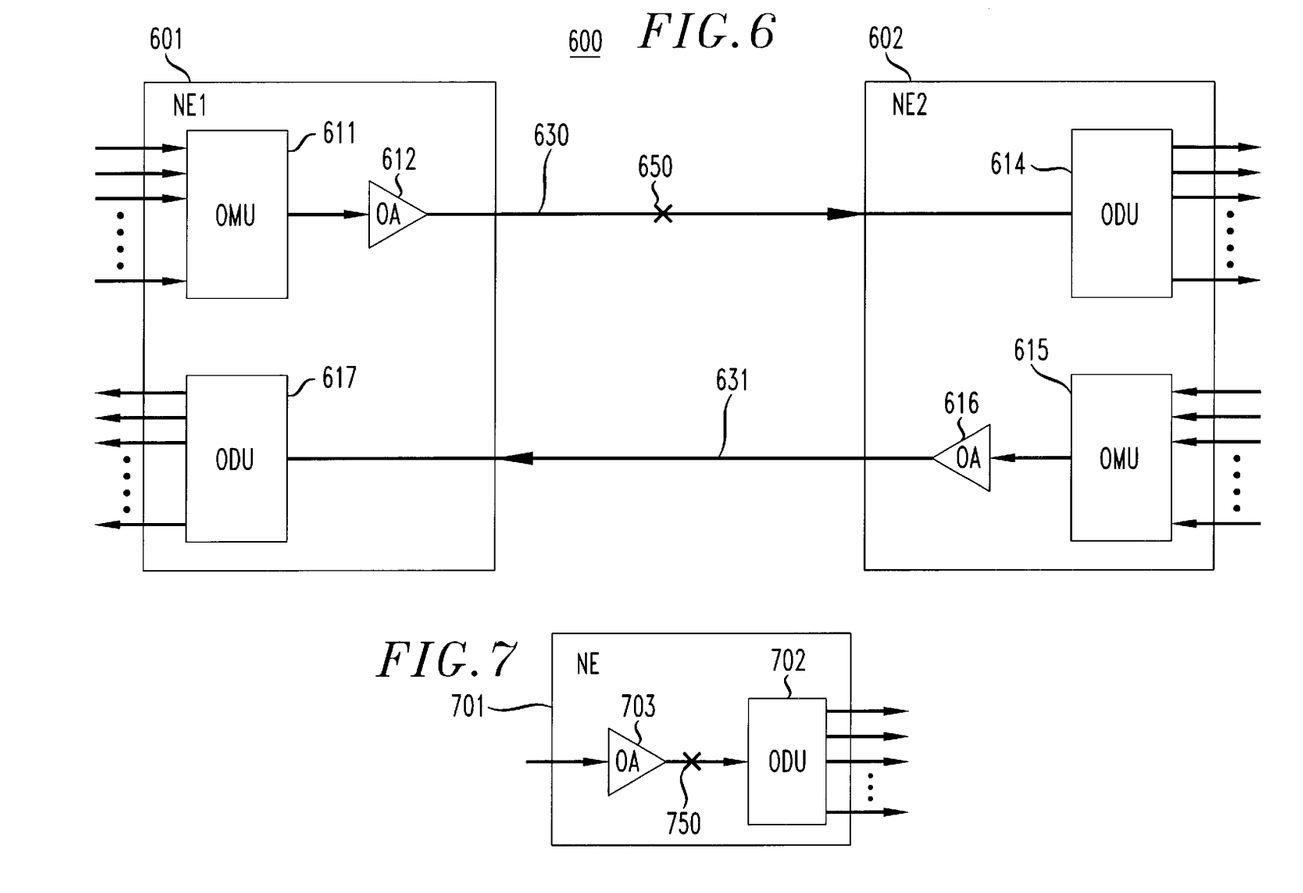

FIG. 6 shows another illustrative embodiment of a system in which the principles of the invention may be employed. More specifically, system 600 includes network element 601 and network element 602 coupled by transmission facilities, such as optical fiber paths 630 and 631. As shown, system 600 is configured in this illustrative embodiment to provide west to east communications via optical fiber path 630 and east to west communications via optical fiber path 631. More specifically, network element 601 includes optical multiplexer unit (OMU) 611 which multiplexes a plurality of input signals and supplies an output signal to optical amplifier 612. Optical amplifier 612 supplies an amplified signal to optical fiber path 630 for transmission in the west to east direction to optical demultiplexer unit (ODU) 614 in network element 602, which demultiplexes the signal accordingly. Similarly, network element 602 includes OMU 615 which multiplexes a plurality of input signals and supplies an output signal to optical amplifier 616. Optical amplifier 616 supplies an amplified signal to optical fiber path 631 for transmission in the east to west direction to ODU 617 in network element 601. Network elements 601 and 602 both include appropriate controllers (not shown) and supervisory units (not shown).

In operation, a break 650 between optical amplifier 612 and ODU 614 could create a hazardous condition in terms of exposure to high power optical signals. In general, the same automatic power shut-down and restart procedures described for the preceding embodiments can also be used for controlling the output power levels of signals transmitted in this configuration. The most notable difference is that detection of loss of signal and loss of supervisory signal at network element 602 along optical fiber path 630 occurs at the input of ODU 614 and detection of loss of signal and loss of supervisory signal at network element 601 along optical fiber path 631 occurs at the input of ODU 617.

FIG. 7 shows another illustrative embodiment of a system in which the principles of the invention may be employed. More specifically, network element 701 includes optical demultiplexer unit (ODU) 702 and optical amplifier 703. A break 750 (e.g., a broken jumper) between optical amplifier 703 and ODU 702 could create a hazardous condition in terms of exposure to high power optical signals. According to the principles of the invention, an automatic power shut-down procedure is triggered by the detection of loss of power at the input to ODU 702. More specifically, according to one illustrative embodiment, a power detector (not shown) inside of ODU 702 is used to detect the loss of input power which triggers the shut-down procedure. If the output power level from optical amplifier 703 is greater than a predetermined threshold, e.g., 10 dBm when the automatic power shut-down procedure is triggered, then controllers and local messaging within network element 701 cause optical amplifier 703 to be powered down to a safe level, e.g., class 1 level of 10 dBm. If the output power level from optical amplifier 703 is less than the predetermined threshold, e.g.,10 dBm, then optical amplifier 703 does not necessarily need to be powered down.

When fiber cut 750 is repaired, a rise in power at the input of ODU 702 is detected. Once the loss of signal condition at the input of ODU 702 is cleared, the automatic power restart function is initiated by controllers and local messaging within network element 701 to increase the output power level of optical amplifier 703 to a value that is appropriate based on the strength of the incoming signal or the number of input channels. The pump power supplied to optical amplifier 703 can then be incrementally increased as previously described while the received optical power at the input of ODU 702 is monitored. The foregoing embodiment is only one of several illustrative embodiments for implementing the automatic power shut-down in an ODU-based network element and other modifications apparent to those skilled in the art are contemplated by the teachings herein.

According to another aspect of the invention, the automatic power shut-down procedures set forth in the foregoing embodiments can also be advantageously used upon the removal of a circuit pack from a system. For example, for an exposure point between the optical transmission line and an optical amplifier, the trigger condition could either be the removal of the downstream or receiving optical amplifier coupled with a loss of supervisory signal power or the removal of the downstream or receiving optical amplifier. The latter case would be applicable where the filtering of the supervisory signal and, consequently, the detection of loss of supervisory signal, occurs inside the optical amplifier itself. Therefore, if the optical amplifier is removed in this situation, then loss of supervisory signal cannot be used as the trigger condition.

Similarly, for an exposure point between an optical amplifier and a wavelength add/drop element, or between the optical transmission line and a wavelength add/drop element, the trigger condition could be the removal of the (downstream or receiving) wavelength add/drop element coupled with a loss of supervisory signal power. More specifically, the removal of the wavelength add/drop element and the disconnection of fibers from the wavelength add/drop element will cause the loss of signal on the supervisory channel. In yet another configuration, for an exposure point between an optical amplifier and an optical demultiplexer unit, the trigger condition could be the removal of the optical demultiplexer unit.

Once the circuit pack is removed from the shelf in all the above scenarios; the automatic power shut-down features of the present invention can be used as previously described to automatically reduce or shut down the pump power being supplied to the optical amplifiers which are generating the high output power levels. The use of an automatic power shut-down during removal of circuit packs is important to prevent a technician or user from possible exposure to the laser in the event that the circuit pack was removed while the optical amplifier is still being supplied with pump power.

The foregoing is merely illustrative of the principles of the invention. Those skilled in the art will be able to devise numerous arrangements, which, although not explicitly shown or described herein, nevertheless embody those principles that are within the spirit and scope of the invention. For example, the controllers mentioned above may be arranged so that they initiate a power reduction or restoration only if a loss of signal persists continuously for a predetermined period of time so that it does not respond to a momentary signal drop out.

We claim:

1. A method of automatically controlling the output power of optical signals transmitted through an optical transmission system, the optical transmission system having at least first and second optical transmission paths for coupling a first and at least second network element, the first network element being coupled to each of the first and second optical transmission paths so that the first network element is transmitting optical signals in the first optical transmission path and receiving optical signals in the second optical transmission path, the second network element being coupled to each of the first and second optical transmission pats so that the second network element is receiving optical signals in the first optical transmission path and transmitting optical signals in die second optical transmission path, the method comprising the steps of:

detecting, at the second network element, a loss of signal in the first optical transmission path resulting from a fault in the first optical transmission path;

responsive to detecting the loss of signal in the first optical transmission path, reducing the output power level of the optical signals being transmitted by the second network element in the second optical transmission path thereby causing a loss of signal therein;

turning off a first supervisory signal being transmitted in the second optical transmission path for a predetermined amount of time;

detecting, at the first network element, both the loss of signal and an absence of the first supervisory signal in the second optical transmission path;

responsive to detecting the loss of signal and the absence of the first supervisory signal in the second optical transmission path, reducing the output power level of the optical signals being transmitted in the first optical transmission path from a first power level to a second power level;

detecting, at the second network element, the presence of a second supervisory signal in the first optical transmission path;

establishing communications between the first and second network elements in the first optical transmission path via the second supervisory signal; and incrementally increasing the power level of the optical signals being transmitted in the first optical transmission path as a function of the monitored power level of the optical signals and the span loss in the first optical transmission path.

2. The method of claim 1 wherein the step of establishing communications between the first and second network elements in the first optical transmission path via the second supervisory signal includes the steps of:

sending a supervisory trace signal to verify the connection between the first and second network elements in the first optical transmission path;

prior to the step of incrementally increasing the power level, sending a notification from the first network element to the second network element; and prior to the step of incrementally increasing the power level, receiving acknowledgement of the notification from the second network element.

3. The method of claim 1 further comprising the step of, when span loss in the first optical transmission path is less than a predetermined threshold, suspending the incremental increase in the power level of the optical signals being transmitted in the first optical transmission path.

4. The method of claim 3, wherein the predetermined threshold is 10 dB.

5. An apparatus for automatically controlling the output power level of optical signals transmitted in an optical transmission system, the optical transmission system having at least first and second optical transmission paths for coupling a first and at least second network element, the first network element being coupled to each of the first and second optical transmission paths so that the first network element is transmitting optical signals in the fist optical transmission path and receiving optical signals in the second optical transmission path, the second network element being coupled to each of the first and second optical transmission paths so that the second network element is receiving optical signals in the first optical transmission path and transmitting optical signals in the second optical transmission path, the apparatus comprising:

at least one detector in the second network element for detecting a loss of signal in the first optical transmission path resulting from a fault in the first optical transmission path;

a first controller, responsive to the detection of the loss of signal in the first optical transmission path, for causing the second network element to reduce the power level at which it is transmitting optical signals in the second optical transmission path, the first controller being further operable to cause a first supervisory signal being transmitted in the second optical transmission path to be turned off for a predetermined amount of time;

at least one detector in the first network element for detecting a loss of signal and an absence of the first supervisory signal in the second optical transmission path; and a second controller, responsive to the detection of the loss of signal and the absence of the first supervisory signal in the second optical transmission path, for causing the first network element to reduce the power level at which it is transmitting optical signals in the first optical transmission path from a first power level to a second power level, wherein the detector in the second network element is further operable to detect the presence of a second supervisory signal in the first optical transmission path, and wherein the first and second controllers are operable to establish communications between the first and second network elements in the first optical transmission path via the second supervisory signal, the second controller being further operable to incrementally increase the power level of the optical signals being transmitted in the first optical transmission path as a function of the monitored power level of the optical signals and the span loss in the first optical transmission path.

6. The apparatus of claim 5 wherein the first controller is operable to send a supervisory trace signal to verify the connection between the first and second network elements in the first optical transmission path, and wherein the first controller is further operable to send a notification message and receive acknowledgement thereto from the first network element to the second network element prior to incrementally increasing the power level of the optical signals.

7. The apparatus of claim 6 wherein, when span loss in the first optical transmission path is less than a predetermined threshold, the second controller is operable to suspend the incremental increase in the power level of the optical signals being transmitted in the first optical transmission path.

8. The apparatus of claim 7, wherein the predetermined threshold is 10 dB.

* * * * *